United States Patent

[11] 3,575,003

[72] Inventor Aldo V. LaRocca
 Villanova, Pa.
[21] Appl. No. 771,570
[22] Filed Oct. 29, 1968
[45] Patented Apr. 13, 1971
[73] Assignee General Electric Company

[54] SEMISOLID PROPELLANT AND THRUSTOR THEREFOR
 7 Claims, 2 Drawing Figs.

[52] U.S. Cl. .................................................. 60/203,
 313/231, 315/111, 60/204
[51] Int. Cl. .................................................. F02k 7/08
[50] Field of Search............................................ 60/203,
 204, 252; 103/1E; 230/1, 69; 313/231, 231.5;
 315/111

[56] References Cited
 UNITED STATES PATENTS
3,233,404  2/1966  Huber et al. ................ 60/202
3,308,623  3/1967  Ferrie et al. ................ 60/203
3,447,322  6/1969  Mastrup ..................... 60/203

Primary Examiner—Carlton R. Croyle
Attorneys—Paul F. Prestia, Allen E. Amgott, Frank L. Neuhauser, Oscar B. Waddell and Henry W. Kaufmann ABSTRACT: A waxlike working substance for electrically powered thrust engines is produced by prolonged heating in vacuo of liquid or soft grease per fluorocarbon polymers. This product flows very readily under surface tension, through tapering passages, moving slowly in its waxlike condition, and more rapidly when heated and so more fluid. It ablates with no residue. These properties permit optimal operation of a thrustor in which fuel is fed radially inward between radially oriented planar electrodes to a central cylindrical or conical aperture.

Patented April 13, 1971 3,575,003

INVENTOR:
ALDO V. LAROCCA,
BY Henry W. Kaufmann
AGENT

SEMISOLID PROPELLANT AND THRUSTOR THEREFOR

CROSS-REFERENCE TO RELATED APPLICATION

Ser. No. 690,168; Propellant Device; A. V. LaRocca; Dec. 13, 1967.

BACKGROUND OF THE INVENTION

1. Field of the Invention

This invention pertains to the art of producing thrust by accelerating gases.

2. Description of the Prior Art

In the referenced copending application it is taught to provide a laminated slug of solid working substance adapted to be rendered gaseous a lamina at a time by an electrical discharge which is applied to the exposed lamina of the slug. The particular electrode configurations taught and the laminated structure assure that all of one lamina is removed before the discharge strikes to the next adjacent lamina. It is necessary to provide means for feeding the slug forward into position in the electrode system as its material is consumed.

In U.S. Pat. No. 3,270,498 it is taught how to employ normal or extremely high viscosity liquids or suspensions of solids in liquids, to provide working substance in an electrode system by feeding the liquids through porous plugs or similar structures. Vaporization by electrical discharge occurs in a manner similar to that described above.

The prior art described is fully operative, to good advantage. However, the use of a fuel slug which remains solid up to the moment of ablation restricts the electrode system to one which is adapted to permit feed of such a slug into a central location in the system, which limits the designer; and solid laminated slugs obviously require somewhat elaborate fabrication or formation processes which it is desirable to avoid if possible, however willingly they might be incurred for the benefits they produce. Similarly, to make a fluid which will remain within the limits of viscosity for which the using apparatus has been designed over as wide a range of temperature as would be desirable, or to retain solids in suspension during months or years of passive storage, involves complications which it would be well to avoid.

Also, while accumulations of residue on electrodes during a normal life span of these devices are not objectionable, a material extraordinarily free from such residue production would offer possibility of greatly increased life; and it would permit the use of structures impractical with the prior art substances.

SUMMARY OF THE INVENTION

A working substance which is one part of my invention has been prepared by treating, as will be described, perfluorinated polymeric oils and greases. These are commercially available, being sold by the Halo Carbon Corporation of Hackensack, New Jersey under the designations Hal-14-25 and Hal-10-25 chlorofluorocarbon polymeric oils, and 25-20M-5A polychlorotrifluoroethylene polymer greases; and by the Dupont Petroleum Chemical Division of E.I. Dupont de Nemours of Wilmington, Del., under the designations Kryotox 143 series fluorinated oils and Kryotox 240 series fluorinated greases. These were heated at atmospheric pressure up to a temperature from 250° to 350° F. (at which temperature they were all extremely fluid) and were then poured into the reservoirs of the electrode systems in which they were later to be used and which had been previously heated to the same or slightly higher temperature. After the filling the system was kept under a pressure of 10 torr., or less at a temperature from 160° to 260° F. for a period ranging from 24 to 72 hours. They were then allowed to cool to room temperature for a period ranging from 4 to 12 hours under a pressure of $10^{15}$ to $10^{16}$ torr. As a result of this treatment, the various substances named were all converted into a substance which was waxy and substantially not liquid at room temperature (80° F.). A beaker of this material having an exposed surface of 12.7 square centimeters was kept under a pressure of $10^{15}$ to $10^{16}$ torr. at a room temperature of 86° F. for several weeks; weighings on an analytical vacuum balance showed loss by evaporation of less than a milligram per week. This waxy substance, which is substantially a solid (i.e., extremely viscous) at room temperature, may have a softening or melting point in the range from 120° F. to 200° F. and is a liquid of viscosity 1,000—2,000 poises at 350° F. It is characterized by the lubricity of typical fluorocarbons; it is readily rendered visibly fluid by moderate heating. Even in the nominally solid state—that is, when it can be picked up in the fingers and handled like a solid without noticeable deformation—it is capable of flowing rheologically under the influence of surface tension. While technically a liquid, as is glass, it may most reasonably be called a solid, to differentiate it from the same material which is at a temperature at which it behaves visibly like a liquid, and may reasonable be called a liquid. However, under these definitions both the solid and the liquid materials are fluid. Both forms are readily gasified by electrical discharge without leaving any tangible residue.

The properties of the working substance permit the operation of a thrustor having a novel electrode structure in which the working substance is fed from all directions of azimuth inwardly to the working space of the electrode system. This is made possible by the fluidity of the working substance, or propellant, which permits it to move along a continuously narrowing passage formed by two adjacent planar electrodes of a circularly symmetrical radial array of such electrodes which are terminated at a fixed distance from the center of symmetry, forming a circularly symmetrical cylindrical space, having a counterelectrode with an axis of symmetry coincident with the axis of symmetry of the cylindrical space. The designer of such a system is thus left with greater freedom of choice of dimensions, and of geometry, since it is evident that, for example, an array of electrodes similar to the boundaries between the segments of an orange could be employed to provide a substantially spherical cavity, with a gas exit in the general direction of the stem. Circular or spherical expansion of the electrode system causes the space behind the electrode face, which is available for storage of working substance, to increase as either the square or the cube of the apparatus dimensions, permitting storage of large quantities of working substance. In view of the capacity of the solid propellant for rheological flow, it is evident that the actual shape of the outside of the propellant container may be more or less arbitrarily chosen, since it will be fed from the outside toward the place of use by at least slow flow under surface tension.

An additional advantage of the radial array of centrally pointing electrodes is that it provides retention of the solid working substance by wedging action, without requiring a retainer which conceals an edge of the solid mass from the ablating discharge and so causes a "shoulder" of residue to remain which prevents proper forward feeding of the solid as it is consumed. Likewise, the spacing between edges of adjacent electrodes may be made sufficiently small to retain the fluid surface of the working substance by surface tension even if the entire mass of it is rendered liquid. (This also permits the use of other kinds of propellants which are always liquid.) Of course, operation under this last described condition permits feeding of the working substance as fast as it can be ablated; and the possibility of increasing substantially without limit the surface to be ablated, by simple design of the electrode array, leaves the designer the option of ablating working substance at any rate, however high, for which his electrical supply can provide the energy.

The ability to store large quantities of working substance is of particular benefit because the working substance of my invention is extremely stable chemically, so that it may be stored for indefinitely long periods; the part of it nearest the electrode working face may be rendered liquid by heating from a discharge (or other means) so that a part of it may be used; rapidly and then the operation may be stopped, the unconsumed working substance may be permitted to solidify again to await for an indefinitely long period before further use. Thus a device employing my invention may be installed initially well in advance of the launching of the vehicle employing it, in the knowledge that it will be able to stand without deterioration until such time as it may be needed. Similarly, it may be carried for long periods on a vehicle in voyage, and activated with no particular preliminaries when, for example, the long voyage nears its end and trimming maneuvers for arriving at the exact destination are begun.

DESCRIPTION OF THE PREFERRED EMBODIMENT

Figure 1:
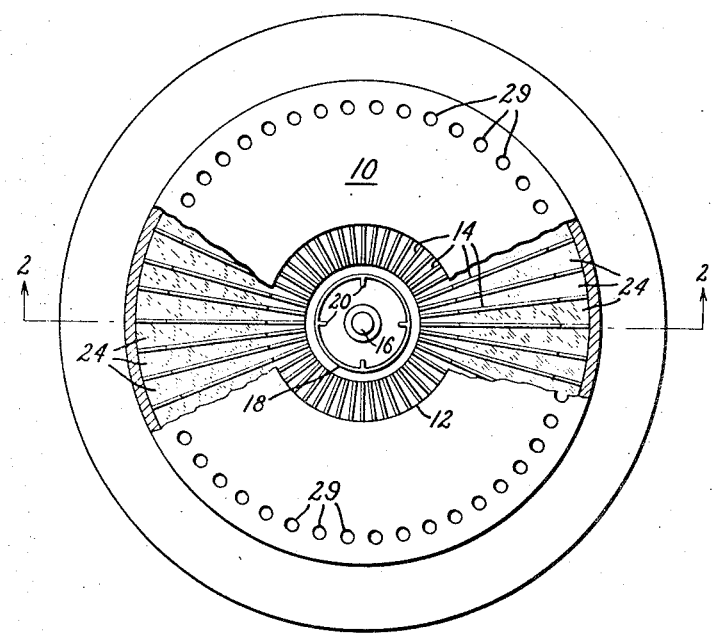
FIG. 1 represents, partly broken away, an end or axial view of an embodiment of my invention.
Figure 2:
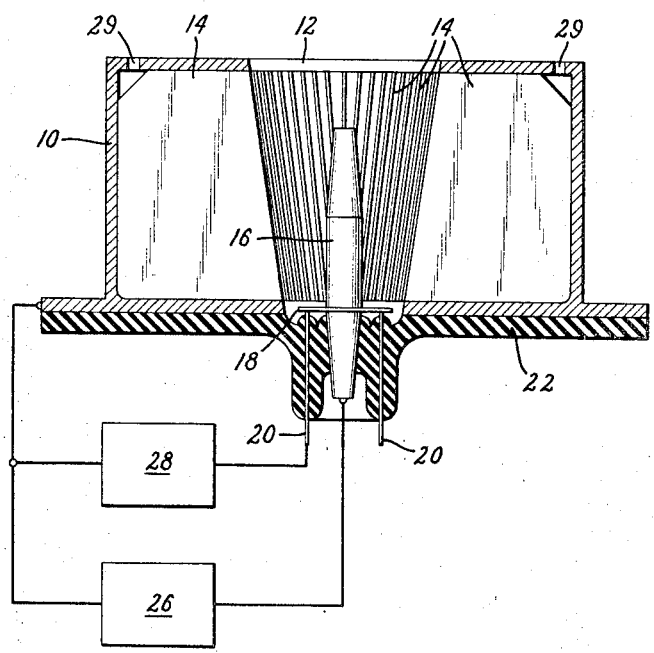
FIG. 2 represents a section of the embodiment of my invention along the section line marked in FIG. 1.

FIG. 1 represents a metal housing 10 having a circular aperture 12 in its face in which there are visible the edges of a plurality of metal plates 14 arranged in radial array, supported (as the cut away portion of FIG. 1 shows) by the interior of housing 10. They are approximately trapezoidal in shape, as the sectional view of FIG. 2 indicates, forming a passage to aperture 12 whose envelope is a truncated cone. In this case the tapering of the interblade passages axially toward the breech creates a component of surface tension feed directed preferentially toward the breech and triggering region, where ablation may be expected to be a maximum. A central electrode 16 is represented located on the axis of the device, surrounded by a triggering electrode 18, which is in the form of a circle supported by electrodes 20 which, like electrode 16, are supported in position by insulating material 22. The space between plates 14 contains propellant 24, whose nature and method of preparation have been described in the Summary of the Invention. A main pulse power supply 26 is represented connected between housing 10 (and thus to plates 14) and central electrode 16; and a triggering power supply 28 is represented connected between housing 10 and plates 14, and triggering electrode 18. Holes 29 are breather holes.

In the preferred mode of operation of this embodiment, power supply 26 provides a potential which is insufficient, in the absence of ionized gas, to produce a disruptive discharge between central electrode 16 and plates 14. Triggering power supply 28, connected to triggering electrode 18, when operated will produce between itself and the edges of plates 14 a field sufficient to ionize by electron emission, or by electrical breakdown the small density of vapor which appears to exist, even in high vacuo, near the surface of propellant 24. (It should be observed that the classes of materials which I have described in the Summary of Invention appear to be peculiar in this respect; when used as supposed insulators in vacuo, they appear to permit gas discharges across them under conditions under which other insulating materials do not break down.) This ionization permits the formation of an initiating discharge, which vaporizes more of the propellant which lies in the spaces between the edges of plates 14. This vapor also becomes ionized, permitting the formation of a discharge between central electrode 16 and the edges of plates 14, (whose locus may itself be described as an electrode face). This latter discharge is, because of the characteristics of pulse power supply 26, much more energetic. It decomposes the exposed layer of flue gasifying it; heating the resulting gas, and causing the resulting pressure to force them forward toward exit orifice 12. In accordance with the known art, electromagnetic forces on the hot ionized gas also contribute energy to move them forward, and cause them to be expelled with high velocity out of the orifice 12. The heat generated by the discharge will also, during continual operation, heat plates 14, which will raise the temperature of propellant 24, causing it to grow softer and liquefy. The term "melt" is used colloquially, as is the term "solid"; actually, even the nominally solid propellant can flow rheologically to feed at low repetition rates. Surface tension will cause the mass of propellant 24 to move continually forward toward the edges of plates 14, maintaining a continuous supply of propellant 24 in the exposed region at the edges of plates 14. If power supply 26 were simply a high-current DC supply, a discharge once initiated could continue until all the propellant 24 had been used up. Since this is seldom desired, power supply 26 is, in the preferred embodiment, a pulse supply (similar, for example, to the pulse-forming networks used in radar transmitter pulsers; or consisting simply of a capacity of suitable value to store the desired pulse energy at the chosen voltage, with suitable charging means such as a resonant charging network connected to a suitable direct current source.) Then each operation of triggering power supply 28 will cause the discharge of a quantity of energy determined by the characteristics of pulse power supply 26, with gasification of a proportionate amount of propellant 24.

It may be noted that the circularly symmetrical structure of the embodiment lends itself well to the provision of a coaxial connection of the pulse power supply 26 from capacitors located immediately behind the insulating material 22; but this is a matter of design technique.

In the embodiment described, the following materials may be used. Housing 10 has been made of copper or aluminum. Plates 14 have been of stainless steel 0.003 inches thick, and of such number that the distance between their inner edges was approximately 0.005 to 0.015 inches. Central electrode 16 was made of copper and triggering electrode 18 was a ring of nickel wire, tantalum, molybdenum, platinum, and osmium-rhenium-molybdenum alloys all being suitable to withstand the high temperatures, sputtering action, and chemical reactivity of the hot gases formed.

To generalize my disclosure, over the specific preferred embodiment I have disclosed, it is evident that the type of thrustor to which my invention is applicable must have at least two opposed electrodes between which a discharge may occur, with appropriate power supplies and means to introduce the working substance or propellant into the discharge path. The electrode structure peculiar to my invention will in general be made up of a number of conductive barriers which form passages which are increasingly narrower down toward a common terminal region of the barriers which locus is effectively a face of an electrode. While the embodiment I have preferred includes the feature that the passages are so narrow at their exits of the electrode face as to retain fluid propellant by surface tension, it would be possible to attach to the barriers at the electrode face a metal sponge or porous material which would serve the same purpose, but would not really be a part of the passages between the barriers. Similarly, while I prefer to rely on the taper of the passages to feed the propellant by surface tension, it would be possible to take advantage of the retention of the propellant by the narrowness of the exits at the electrode face and of the feasibility of feeding propellant centrally from a large radially disposed store, and yet to provide some small external pressure to feed the propellant rather than rely exclusively on surface tension.

I claim:
1. In a thrustor which comprises:
  at least two opposed electrodes for passing of an electrical discharge therebetween;
  means for the introduction of a vaporizable gasifiable propellant adjacent to one of the said electrodes, for vaporization and gasification into the path of the said discharge;
  electrical power supply means connected to said electrodes to provide electrical energy for the said discharge;
  the improvement which comprises a structure of at least one of said electrodes comprising a plurality of electrically and thermally conductive barriers which form passages which are increasingly narrow toward an electrode face which is the locus of the terminations of the said barriers.

2. The improvement claimed in claim 1 in which the said passages are sufficiently narrow at the said electrode face to retain the propellant by surface tension when it is in a fluid state.

3. The improvement claimed in claim 1 in which the said passages adjacent to the said electrode face contain and feed a fluid propellant to the said electrode face by surface tension.

4. The improvement claimed in claim 1 in which the therein said barriers are planar elements arranged radially so that each is coplanar with a common central axis.

5. The improvement claimed in claim 4 in which the locus of the terminations of the therein said barriers is circularly symmetrical around the therein said common central axis.

6. The improvement claimed in claim 1 comprising in addition a supply, in the therein said passages, of a vaporizable gasifiable propellant comprising a perfluorocarbon polymer which is substantially solid as defined at 80° F. and is liquid at a temperature of 350° F.

7. The method of providing working substance to a thrustor which produces thrust by accelerating a gas by electrical discharges therethrough in a discharge region, which comprises the steps of:
   providing a supply of propellant which is fluid in both its substantially solid and liquid conditions;
   introducing the said propellant into tapered passages terminating in the said discharge region;
   causing electrical discharges in the said discharge region to vaporize and gasify the said propellant and accelerate the gas thereby produced.